United States Patent
Yamada et al.

(10) Patent No.: US 8,517,404 B2
(45) Date of Patent: Aug. 27, 2013

(54) TOE CORRECT BUSH

(75) Inventors: Ryusuke Yamada, Komaki (JP); Yorikazu Nakamura, Kasugai (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 13/613,357

(22) Filed: Sep. 13, 2012

(65) Prior Publication Data
US 2013/0001915 A1 Jan. 3, 2013

Related U.S. Application Data

(63) Continuation of application No. PCT/JP2011/004952, filed on Sep. 5, 2011.

(30) Foreign Application Priority Data

Sep. 29, 2010 (JP) .................................. 2010-218278

(51) Int. Cl.
*B60G 11/22* (2006.01)
(52) U.S. Cl.
USPC ...... 280/124.177; 280/124.106; 280/124.107; 280/124.166; 280/86.758; 267/257; 267/292
(58) Field of Classification Search
USPC ..................... 280/124.177, 124.106, 124.107, 280/126.116, 124.166, 86.758; 267/257; 267/292; 16/2.1, 2.2
See application file for complete search history.

(56) References Cited

U.S. PATENT DOCUMENTS

| | | | | |
|---|---|---|---|---|
| 5,954,350 | A * | 9/1999 | Santo et al. ............ | 280/124.107 |
| 6,179,328 | B1 | 1/2001 | Kawagoe et al. | |
| 6,398,200 | B1 | 6/2002 | Kakimoto et al. | |
| 7,252,298 | B2 * | 8/2007 | Hughes .................. | 280/124.128 |
| 2002/0093170 | A1 * | 7/2002 | Deschaume et al. ... | 280/124.177 |
| 2003/0111819 | A1 * | 6/2003 | Bae ........................ | 280/124.177 |
| 2004/0160033 | A1 | 8/2004 | Kawamata et al. | |
| 2007/0194549 | A1 * | 8/2007 | Germano et al. ...... | 280/124.107 |
| 2008/0036166 | A1 * | 2/2008 | Russell et al. .......... | 280/124.107 |

FOREIGN PATENT DOCUMENTS

| | | |
|---|---|---|
| EP | 0872367 | 10/1998 |
| JP | 2000-280718 | 10/2000 |
| JP | 2002-103937 | 4/2002 |
| JP | 2004-148999 | 5/2004 |
| JP | 2006-046588 | 2/2006 |
| JP | 2007-313934 | 12/2007 |
| JP | 2009-024734 | 2/2009 |
| WO | 99/15809 | 4/1999 |
| WO | 03/000511 | 1/2003 |

OTHER PUBLICATIONS

International Search Report, mail date is Nov. 15, 2011.

* cited by examiner

*Primary Examiner* — Joseph Rocca
*Assistant Examiner* — Darlene P Condra
(74) *Attorney, Agent, or Firm* — Greenblum & Bernstein P.L.C.

(57) ABSTRACT

To provide a toe correct bush having excellent durability and a novel structure, the toe correct bush effectively achieving improvement in running stability during steering with a toe correction function and improvement in straight line performance with an intermediate restraining plate. A first intermediate restraining member is provided between opposing surfaces of an inner inclined portion and an outer inclined portion and is fixed to a compression rubber, the first intermediate restraining member spreading and being isolated from the opposing surfaces of the inner inclined portion and the outer inclined portion. A second intermediate restraining member is provided independent from the first intermediate restraining member between opposing surfaces of an inner flange and an outer flange and is fixed to a connecting rubber, the second intermediate restraining member spreading and being isolated from the opposing surfaces of the inner flange and the outer flange.

5 Claims, 15 Drawing Sheets

TOE CORRECT BUSH

CLAIM FOR PRIORITY

This application is a continuation of PCT/JP2011/004952 filed Sep. 5, 2011, and claims the priority benefit of Japanese Application No. 2010-218278, filed Sep. 29, 2010, the contents of which is expressly incorporated by reference in its entirety.

TECHNICAL FIELD

The present invention relates to a toe correct bush, which is a type of suspension bush of a vehicle. The present invention relates in particular to a toe correct bush having a novel structure suitably used in a torsion beam rigid axle suspension mechanism and mounted on each of left and right trailing arms in a portion attached to a body.

BACKGROUND ART

A toe correct bush as disclosed in Japanese Patent Laid-Open Publication No. 2006-46588 (Patent Literature 1), for example, is known as a conventional type of suspension bush mounted on each of left and right trailing arms in a portion attached to a body, the trailing arms being connected by a torsion beam in a torsion beam rigid axle suspension mechanism in a vehicle. Such a toe correct bush has an inner shaft member and an outer tubular member that are connected by a main rubber elastic body. The toe correct bush also has an inner flange and an outer flange that project radially outward from one end portion in a shaft direction of the inner shaft member and the outer tubular member. A connecting rubber (compression rubber) is provided between opposing surfaces of the inner flange and the outer flange.

In order to improve a toe correction function, an inner inclined portion and an outer inclined portion obliquely projecting outward in the shaft direction are provided in one end portion in the shaft direction of the inner shaft member and the outer tubular member, as disclosed in Japanese Patent Laid-Open Publication No. 2000-280718 (Patent Literature 2). A compression rubber is provided between opposing surfaces of the inclined portions.

The toe correct bush disclosed in Patent Literature 1 has a structure in which an intermediate restraining member is fixed to the connecting rubber in order to increase spring stiffness in the shaft direction to improve running stability. Specifically, the intermediate restraining member having a circumferentially continuous annular planar shape is disposed between the opposing surfaces of the inner flange and the outer flange so as to surround the inner shaft member and is vulcanized to the connecting rubber.

However, application of such an annular planar intermediate restraining member to the toe correct bush having the inclined portions as disclosed in Patent Literature 2 may deform and damage the intermediate restraining member at maximum load input in a tilt direction. Specifically, a circumferential portion of the annular intermediate restraining member is fixed to the compression rubber while another circumferential portion thereof is fixed to the connecting rubber. Then, a greater strain may be exerted on the intermediate restraining member depending on the difference in the shape of the compression rubber and the connecting rubber, thus damaging the intermediate restraining member.

It is considered that rubber materials for the compression rubber and the connecting rubber may be changed to have harder rubber stiffness so as to increase a deformation restraint relative to the intermediate restraining member and thus to prevent deformation or damage of the intermediate restraining member. However, tilt displacement is unlikely to occur between the inner shaft member and the outer tubular member, thus leading to insufficient effects in improvement in running stability and the like from the toe correction function.

CITATION LIST

Patent Literature

[Patent Literature 1] Japanese Patent Laid-Open Publication No. 2006-46588
[Patent Literature 2] Japanese Patent Laid-Open Publication No. 2000-280718

SUMMARY OF INVENTION

Technical Problem

In view of the circumstances above, an object of the present invention is to provide a toe correct bush having excellent durability and a novel structure, the toe correct bush effectively achieving improvement in running stability during steering with a toe correction function and improvement in straight line performance with an intermediate restraining plate.

Solution to Problem

Specifically, a first aspect of the present invention provides a toe correct bush in which an inner shaft member and an outer tubular member inserted around the external of the inner shaft member are connected by a main rubber elastic body; an inner inclined portion is provided in an end portion in a shaft direction of the inner shaft member, the inner inclined portion being inclined outward in the shaft direction and projecting obliquely outward in one radial direction; an outer inclined portion is provided in an end portion in a shaft direction of the outer tubular member, the outer inclined portion being inclined outward in the shaft direction, projecting obliquely outward in one radial direction, and being provided opposite to the inner inclined portion; a compression rubber is provided between opposing surfaces of the inner inclined portion and the outer inclined portion; an inner flange is provided in the end portion in the shaft direction of the inner shaft member, the inner flange projecting outward in the radial direction opposite to the inner inclined portion; an outer flange is provided in the end portion in the shaft direction of the outer tubular member, the outer flange projecting outward in the radial direction opposite to the outer inclined portion, and being provided opposite to the inner flange; and a connecting rubber is provided between opposing surfaces of the inner flange and the outer flange, the toe correct bush including a first intermediate restraining member provided between the opposing surfaces of the inner inclined portion and the outer inclined portion and fixed to the compression rubber, the first intermediate restraining member spreading and being isolated from the opposing surfaces of the inner inclined portion and the outer inclined portion; and a second intermediate restraining member provided independent from the first intermediate restraining member between the opposing surfaces of the inner flange and the outer flange and fixed to the connecting rubber, the second intermediate restraining member spreading and being isolated from the opposing surfaces of the inner flange and the outer flange.

According to the toe correct bush of the first aspect, in addition to the second intermediate restraining member provided between the inner flange and the outer flange, the first intermediate restraining member is provided between the inner inclined portion and the outer inclined portion. Thus, the compression rubber that connects the inner inclined portion and the outer inclined portion improves a toe correction function. Furthermore, the first intermediate restraining member controls a spring of the compression rubber, thus concurrently enhancing straight line performance of a vehicle.

In addition, since the first intermediate restraining member and the second intermediate restraining member are mutually independent members, the property required for the compression rubber and the property required for the connecting rubber can be achieved individually at a high level. This is achieved by freely setting the shape of the first intermediate restraining member and the shape of the second intermediate restraining member independently from each other or by disposing the first intermediate restraining member and the second intermediate restraining member in different positions in the shaft direction.

Furthermore, the first intermediate restraining member fixed to the compression rubber and the second intermediate restraining member fixed to the connecting rubber are mutually independent members. Thus, the strain in the intermediate restraining members is reduced, the strain being associated with the difference in shape between the compression rubber and the connecting rubber. Accordingly, deformation and damage of the first and second intermediate restraining members are prevented and durability is improved.

A second aspect of the present invention provides the toe correct bush according to the first aspect, in which the first intermediate restraining member is isolated from both of the inner shaft member and the outer tubular member and is elastically connected through the compression rubber, and the second intermediate restraining member is isolated from both of the inner shaft member and the outer tubular member and is elastically connected through the connecting rubber.

According to the second aspect, the first and second intermediate restraining members are both elastically connected to the inner shaft member and the outer tubular member. Thus, a spring constant is prevented from being increased in a twist direction (circumferential direction) of the compression rubber and the connecting rubber in association with fixing of the intermediate restraining members. Accordingly, wheels are smoothly moved in a vertical direction, improving anti-vibration performance relative to roughness of a road surface and thus achieving excellent ride comfort.

A third aspect of the present invention provides the toe correct bush according to the first or second aspect, in which the first intermediate restraining member and the second intermediate restraining member are isolated from each other.

According to the third aspect, the first intermediate restraining member and the second intermediate restraining member, which are independent members, are isolated from each other. Thus, the difference in deformation amount between the compression rubber and the connecting rubber is allowed by a gap provided between the first and second intermediate restraining members. Accordingly, deformation or damage of the intermediate restraining members is prevented due to the difference in shape between the compression rubber and the connecting rubber.

A fourth aspect of the present invention provides the toe correct bush according to one of the first to third aspects, in which the first intermediate restraining member and the second intermediate restraining member are opposite to each other with the inner shaft member therebetween, a pair of first feet is integrally provided in the first intermediate restraining member on two sides of the inner shaft member, the first feet projecting inward in an opposing direction to the second intermediate restraining member, and a pair of second feet is integrally provided in the second intermediate restraining member on two sides of the inner shaft member, the second feet projecting inward in an opposing direction to the first intermediate restraining member.

According to the fourth aspect, a fixing area of the first intermediate restraining member to the compression rubber and a fixing area of the second intermediate restraining member to the connecting rubber are both efficiently secured, thus allowing the intermediate restraining members to more effectively control spring properties.

A fifth aspect of the present invention provides the toe correct bush according to the fourth aspect, in which the first feet each have a first mold holder projecting to an exterior from the compression rubber, and the second feet each have a second mold holder projecting to an exterior from the connecting rubber.

According to the fifth aspect, the first mold holder is supported by a mold for molding of the compression rubber, and thus the first intermediate restraining member is positioned and fixed to a predetermined position relative to the compression rubber. Furthermore, the second mold holder is supported by a mold for molding of the connecting rubber, and thus the second intermediate restraining member is positioned and fixed to a predetermined position relative to the connecting rubber. Accordingly, the first and second intermediate restraining members are properly positioned and fixed to the compression rubber and the connecting rubber, respectively, thus achieving target spring properties.

A sixth aspect of the present invention provides the toe correct bush according to one of the first to fifth aspects, in which a distance between the opposing surfaces of the first intermediate restraining member and the inner inclined portion is shorter than a distance between the opposing surfaces of the first intermediate restraining member and the outer inclined portion, and a distance between the opposing surfaces of the second intermediate restraining member and the inner flange is shorter than a distance between the opposing surfaces of the second intermediate restraining member and the outer flange.

According to the sixth aspect, the free length of the rubber is largely ensured in portions relatively prone to cracks in the compression rubber and the connecting rubber, thus improving the durability of the compression rubber and the connecting rubber.

Advantageous Effects of Invention

The intermediate restraining member is also fixed to the compression rubber provided for improving the toe correction function, thus improving running stability of a vehicle. In addition, the first intermediate restraining member fixed to the compression rubber and the second intermediate restraining member fixed to the connecting rubber are mutually independent separate members. Thus, the intermediate restraining members are prevented from deforming in association with the difference in shape of the compression rubber and the connecting rubber, achieving improvement in durability.

DESCRIPTION OF EMBODIMENTS

An embodiment of the present invention is described below with reference to the drawings.

A toe correct bush 10 according to the embodiment of the present invention is illustrated in FIGS. 1 to 4. The toe correct bush 10 has an inner shaft member 12 and an outer tubular member 14 inserted around the external thereof with a predetermined distance between the members. The inner shaft member 12 and the outer tubular member 14 are elastically connected by a main rubber elastic body 16. In the description below, a vertical direction basically refers to a vertical direction in FIG. 1.

Figure 5:
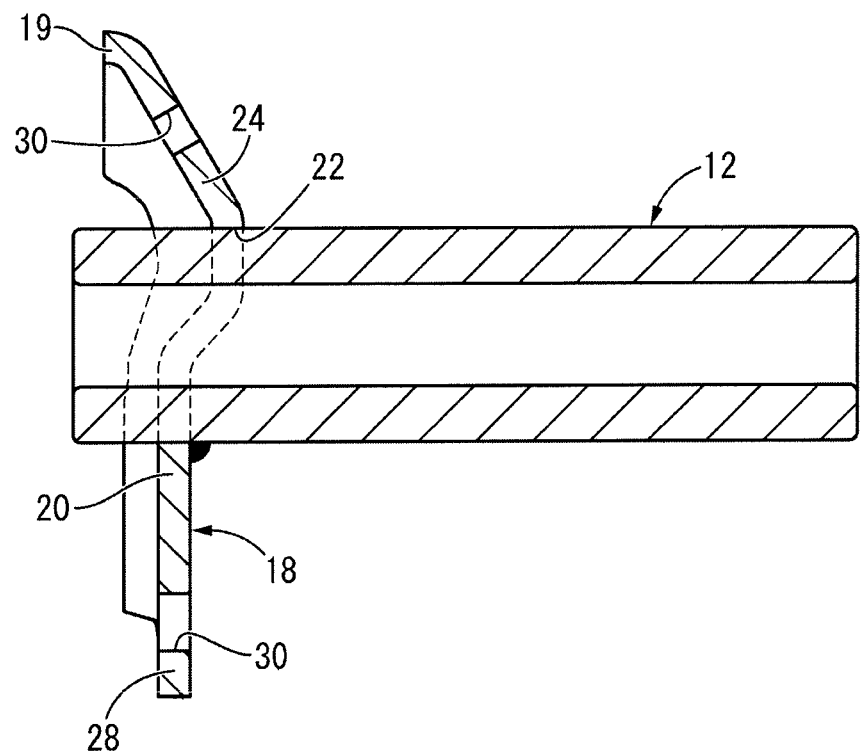
[FIG. 5] A vertical cross-sectional view illustrating an inner shaft member and a fixing plate included in the toe correct bush illustrated in FIG. 1, the view corresponding to a cross section along line V-V of FIG. 6.
Figure 6:
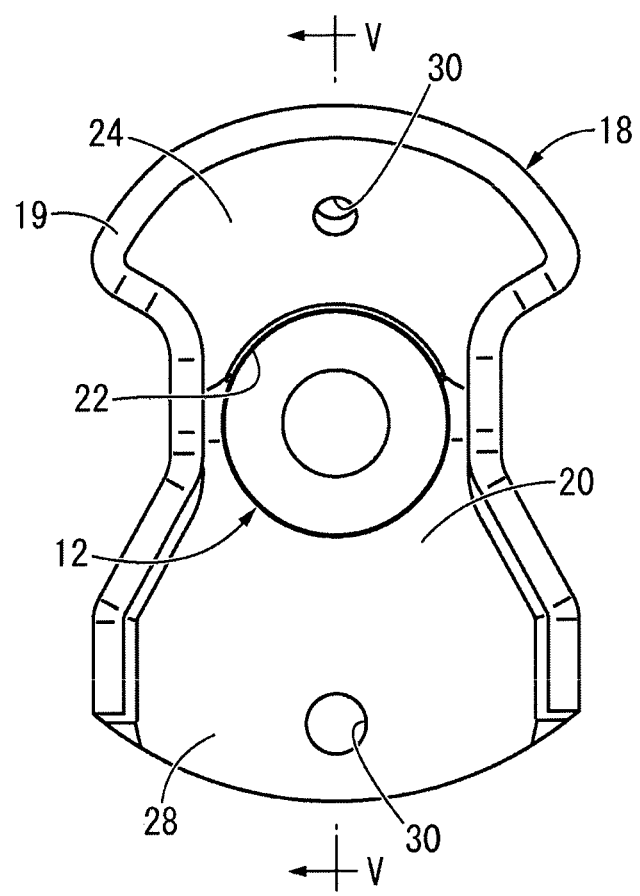
[FIG. 6] A front view of the inner shaft member and the fixing plate illustrated in FIG. 5.

More specifically, the inner shaft member 12 has a substantially tubular shape having a small diameter, as shown in FIGS. 5 and 6. A planar fixing plate 18 is fixed proximate to one end portion in a shaft direction. The fixing plate 18 has a plate shape provided with a reinforcement rib 19 along its periphery excluding a lower end, the reinforcement rib 19 projecting in a thickness direction, which is the shaft direction of the inner shaft member. An intermediate portion thereof is an attachment portion 20 having a substantially constant width. The attachment portion 20 has a mounting hole 22 penetrating in the plate thickness direction. The inner shaft member 12 is inserted and welded to the mounting hole 22, and thus the fixing plate 18 is fixed proximate to the end portion of the inner shaft member 12. The attachment portion 20 of the fixing plate 18 has a tapered step in an intermediate portion in a length direction (vertical direction in FIG. 5), and thus portions on two sides having the step therebetween are provided at different levels in the plate thickness direction.

An inner inclined portion 24 is integrally provided to the attachment portion 20 in one end portion thereof in the length direction. The inner inclined portion 24 is a substantially fan-shaped planar member having a wider width as is distant from the inner shaft member 12. The inner inclined portion 24 spreads at a substantially constant inclined angle relative to the center shaft I of the inner shaft member 12.

An inner flange 28 is integrally provided to the attachment portion 20 in the other end portion thereof in the length direction. The inner flange 28 spreads in a direction substantially orthogonal to the center shaft I of the inner shaft member 12. The inner flange 28 has a tapered shape having a wider width as the end portion on the attachment portion 20 side is distant from the attachment portion 20.

Each of the inner inclined portion 24 and the inner flange 28 has an outer end surface in the length direction having an arcuate curved surface substantially centering on the center shaft I of the inner shaft member 12. Furthermore, each of the inner inclined portion 24 and the inner flange 28 has a circular connecting hole 30 penetrating in the plate thickness direction.

Figure 7:
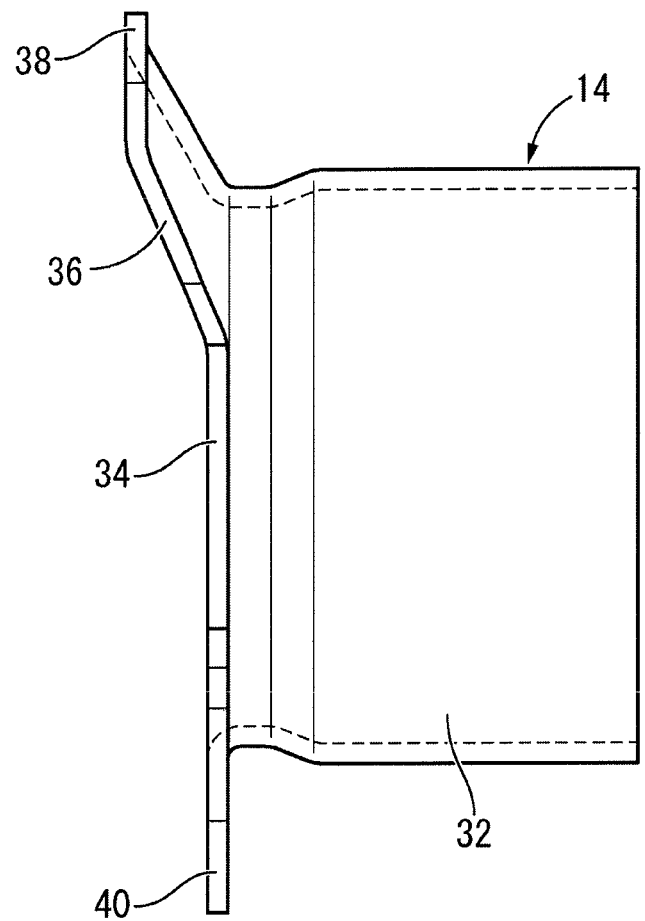
[FIG. 7] A right side view of an outer tubular member included in the toe correct bush illustrated in FIG. 1.
Figure 8:
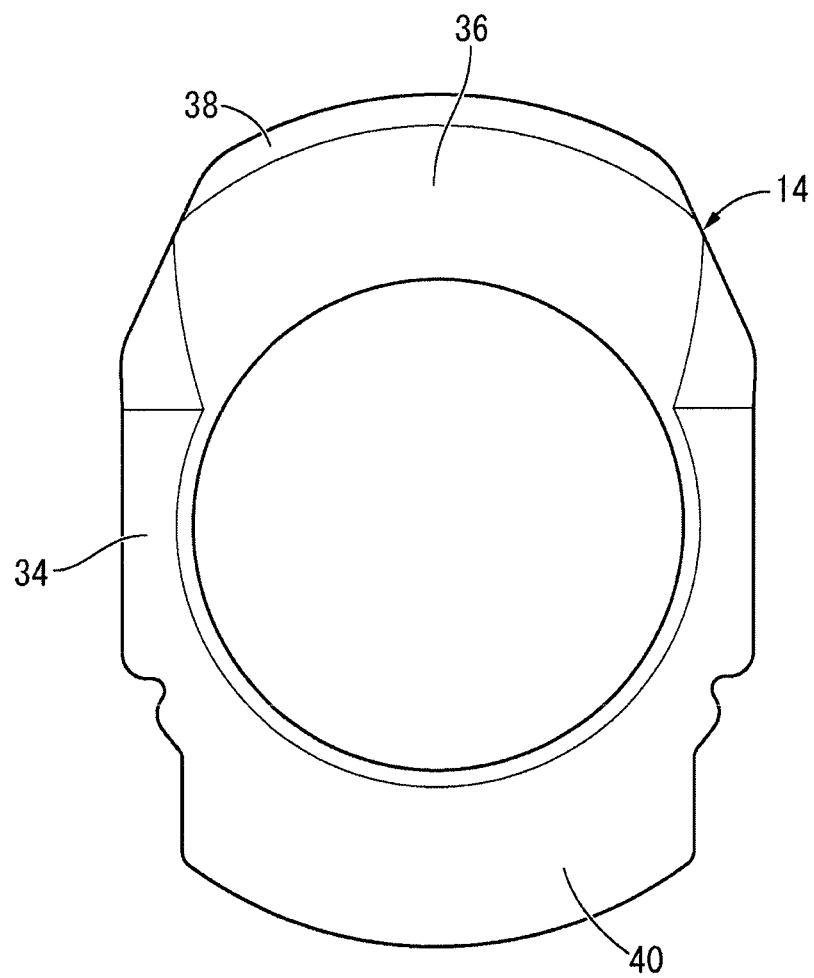
[FIG. 8] A front view of the outer tubular member illustrated in FIG. 7.

The outer tubular member 14 has a tubular portion 32 having a substantially tubular shape and a large diameter, as shown in FIGS. 7 and 8. The outer tubular member 14 is concentrically inserted around the external of the inner shaft member 12 with a distance therefrom in a radially outward direction. Furthermore, the length in the shaft direction of the outer tubular member 14 is shorter than that of the inner shaft member 12. Thus, two end portions in the shaft direction of the inner shaft member 12 project outward in the shaft direction from the outer tubular member 14.

An annular flange 34 projecting in the radially outward direction is integrally provided to an opening periphery on one side of the shaft direction of the tubular portion 32. Furthermore, a circumferential portion of the flange 34 extends in the radially outward direction and is provided as an outer inclined portion 36 obliquely extending outward in the shaft direction. The outer inclined portion 36 has a planar shape spreading at a substantially constant inclined angle relative to the center shaft I of the inner shaft member 12 and the outer tubular member 14. An end projection 38 is integrally provided to the outer inclined portion 36, the end projection 38 projecting outward in the direction orthogonal to the shaft from a projecting end portion of the outer inclined portion 36.

Another circumferential portion of the flange 34 is provided as an outer flange 40 more largely projecting in the radially outward direction. The outer flange 40 has a planar shape spreading in the direction orthogonal to the shaft and projects in the radially outward direction opposite to the outer inclined portion 36.

Figure 1:
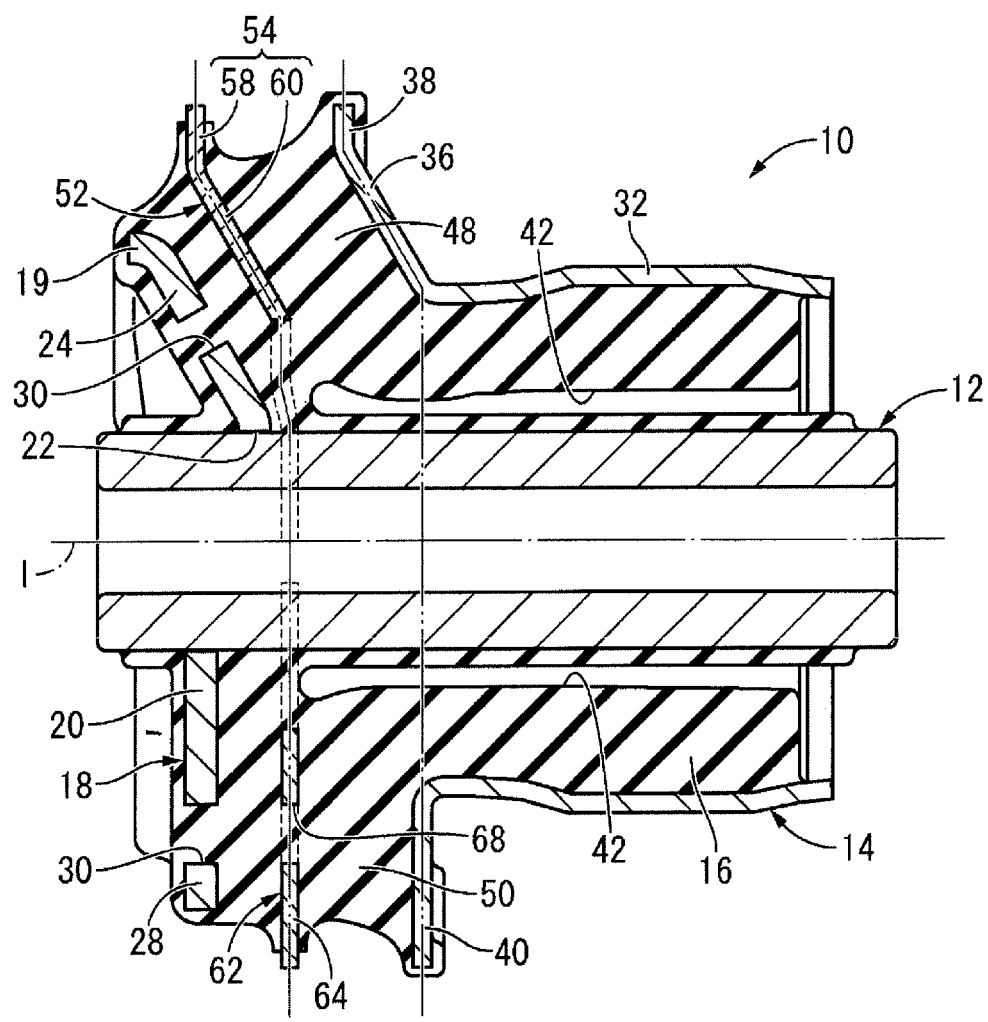
[FIG. 1] A vertical cross-sectional view illustrating a toe correct bush according to an embodiment of the present invention, the view corresponding to a cross section along line I-I of FIG. 2.

As shown in FIG. 1, the inner shaft member 12 and the outer tubular member 14 are concentrically disposed. The main rubber elastic body 16 is disposed between the inner shaft member 12 and the tubular portion 32 of the outer tubular member 14. The main rubber elastic body 16 has a thick, substantially tubular shape as a whole. An inner peripheral surface thereof is vulcanized to an outer peripheral surface of the inner shaft member 12 while an outer peripheral surface thereof is vulcanized to an outer peripheral surface of the outer tubular member 14. Thus, the inner shaft member 12 and the outer tubular member 14 are elastically connected by the main rubber elastic body 16. The main rubber elastic body 16 is an integrally vulcanized molding to which the inner shaft member 12 and the outer tubular member 14 are provided.

Figure 3:
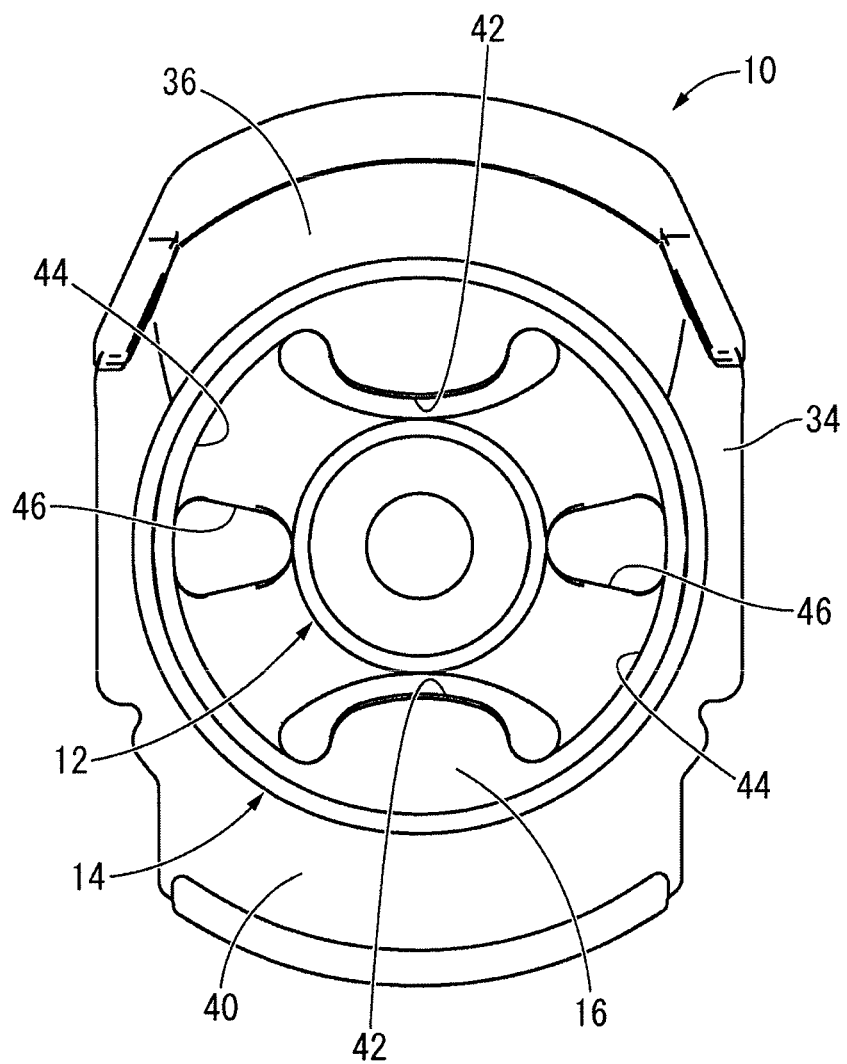
[FIG. 3] A rear view of the toe correct bush illustrated in FIG. 1.
Figure 4:
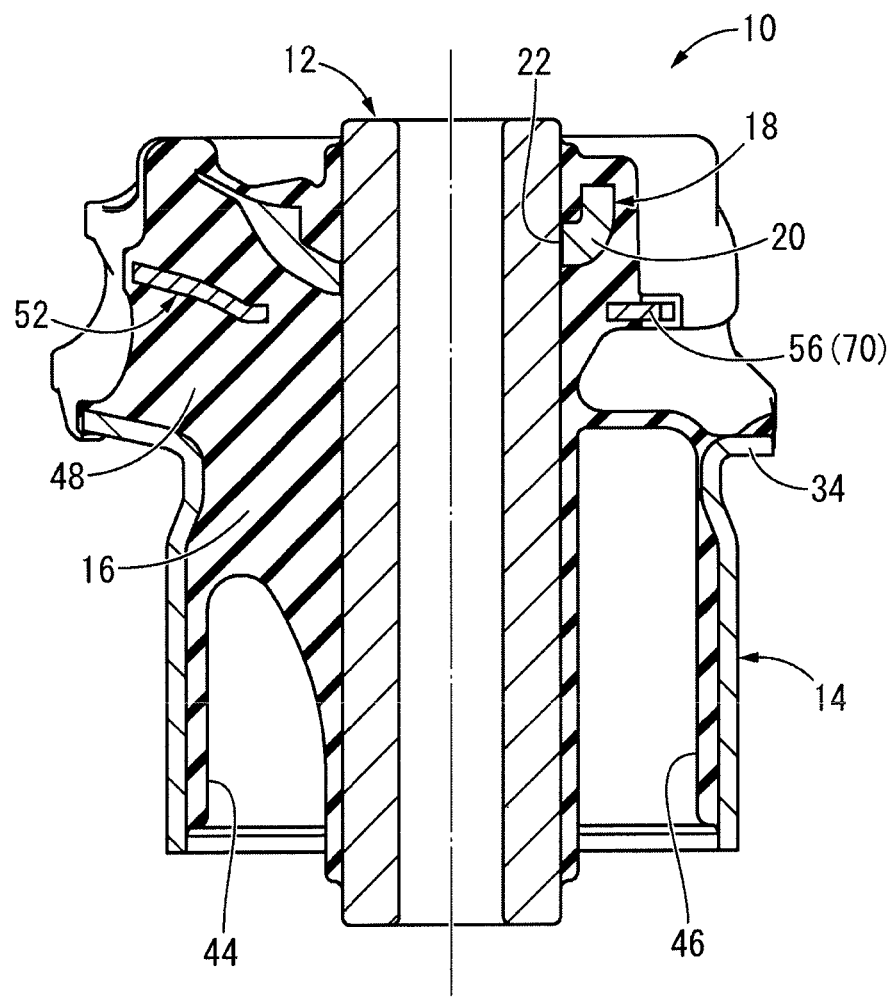
[FIG. 4] A cross-sectional view along line IV-IV of FIG. 2.

The main rubber elastic body 16 has a pair of slits 42, which are recesses open to the other end surface in the shaft direction and are disposed on two sides with the inner shaft member 12 in between. Furthermore, as shown in FIG. 3, the main rubber elastic body 16 has peripheral grooves 44 between the pair of slits 42 in the circumferential direction. A hollow portion 46 is provided on the periphery of each of the peripheral grooves 44. The hollow portions 46 are recessed portions wider in the radial direction and shallower in the shaft direction than the slits 42. The hollow portions 46 are provided on two sides with the inner shaft member 12 in between in a radial direction substantially orthogonal to the opposing direction of the pair of slits 42.

The inner inclined portion 24 and the outer inclined portion 36 are disposed opposite and substantially in parallel to each other and are elastically connected by a compression rubber 48 disposed between opposing surfaces thereof. The compression rubber 48 is a thick planar rubber elastic body integrally provided to the main rubber elastic body 16. One surface thereof is vulcanized to the inner inclined portion 24 and the other surface thereof is vulcanized to the outer inclined portion 36. The compression rubber 48 is also vulcanized to the outer end surface in the shaft direction of the fixing plate 18 through the connecting holes 30 and covers substantially the entire surface of the fixing plate 18. The compression rubber 48 is further vulcanized to the end projection 38 of the outer tubular member 14 and the outer periphery of the outer flange 40.

The reinforcement rib 19 on the projecting end of the inner inclined portion 24 projects outward in the shaft direction, while the end projection 38 on the projecting end of the outer inclined portion 36 projects outward in the shaft direction. This ensures a large free length of the outer end surface of the compression rubber 48.

The inner flange 28 and the outer flange 40 are disposed opposite and substantially in parallel to each other and are elastically connected by a connecting rubber 50 disposed between opposing surfaces thereof. The connecting rubber 50 is a substantially arcuate planar rubber elastic body integrally provided to the main rubber elastic body 16. One surface thereof is vulcanized to the inner flange 28 and the other surface thereof is vulcanized to the outer flange 40.

Figure 9:
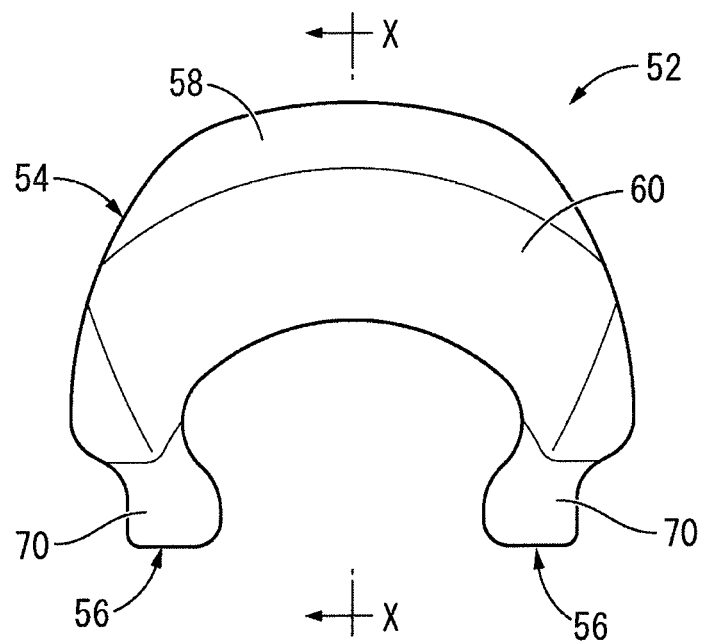
[FIG. 9] A front view of a first intermediate restraining member included in the toe correct bush illustrated in FIG. 1.
Figure 10:
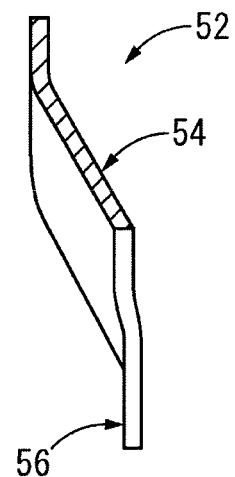
[FIG. 10] A cross-sectional view along line X-X of FIG. 9.

A first intermediate restraining member 52 is disposed between the opposing surfaces of the inner inclined portion 24 and the outer inclined portion 36 and is fixed to the compression rubber 48. As shown in FIGS. 9 and 10, the first intermediate restraining member 52, as a whole, is a substantially semiannular planar fitting having a structure in which first feet 56 project from two circumferential ends of a first main body 54 having a substantially arcuate planar shape.

The first main body 54 has a substantially arcuately curved planar shape extending in the circumferential direction. A circumferentially central portion thereof is radially wider than the two end portions. An upper end portion of the first main body 54 is provided as a planar support end portion 58 spreading in the direction substantially orthogonal to the shaft. A lower portion of the first main body 54 is provided as an intermediate inclined portion 60 having a tapered planar shape spreading substantially in parallel to the inner inclined portion 24 and the outer inclined portion 36.

Each of the first feet 56 is a narrow planar portion projecting downward from an inner periphery of the circumferential end portion of the first main body 54 and is integrally provided to the first main body 54. Similar to the upper end portion of the first main body 54, the first feet 56 each spread in the direction substantially orthogonal to the shaft. Furthermore, the first feet 56 each bulge toward the inner periphery and are gradually wider toward an intermediate portion in the projecting direction.

Figure 11:
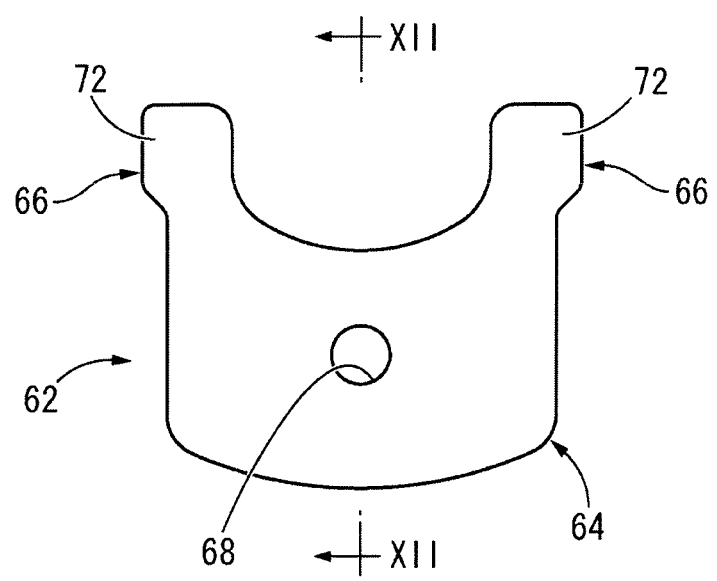
[FIG. 11] A front view of a second intermediate restraining member included in the toe correct bush illustrated in FIG. 1.
Figure 12:
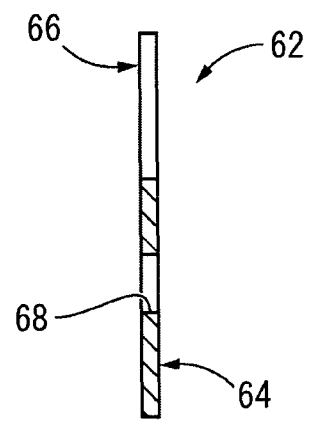
[FIG. 12] A cross-sectional view along line XII-XII of FIG. 11.

A second intermediate restraining member 62 is disposed between the opposing surfaces of the inner flange 28 and the outer flange 40 and is fixed to the connecting rubber 50. As shown in FIGS. 11 and 12, the second intermediate restraining member 62 is a substantially planar fitting having a gate shape as a whole. The second intermediate restraining member 62 is integrally provided with a second main body 64 extending in the circumferential direction and second feet 66 projecting from two ends of the second main body 64.

The second main body 64 has a substantially arcuately curved planar shape extending in the circumferential direction. Two circumferential end surfaces (left and right end surfaces in FIG. 11) are vertically spreading flat surfaces. The second main body 64 has a circumferentially central portion having a substantially constant width and a circular connecting hole 68 penetrating in the plate thickness direction in a substantially circumferentially central portion.

Each of the second feet 66 is a narrow planar portion projecting upward from the circumferential end portion of the second main body 64 and is integrally provided to the second main body 64. The second feet 66 project more circumferentially outward than the second main body 64.

Figure 2:
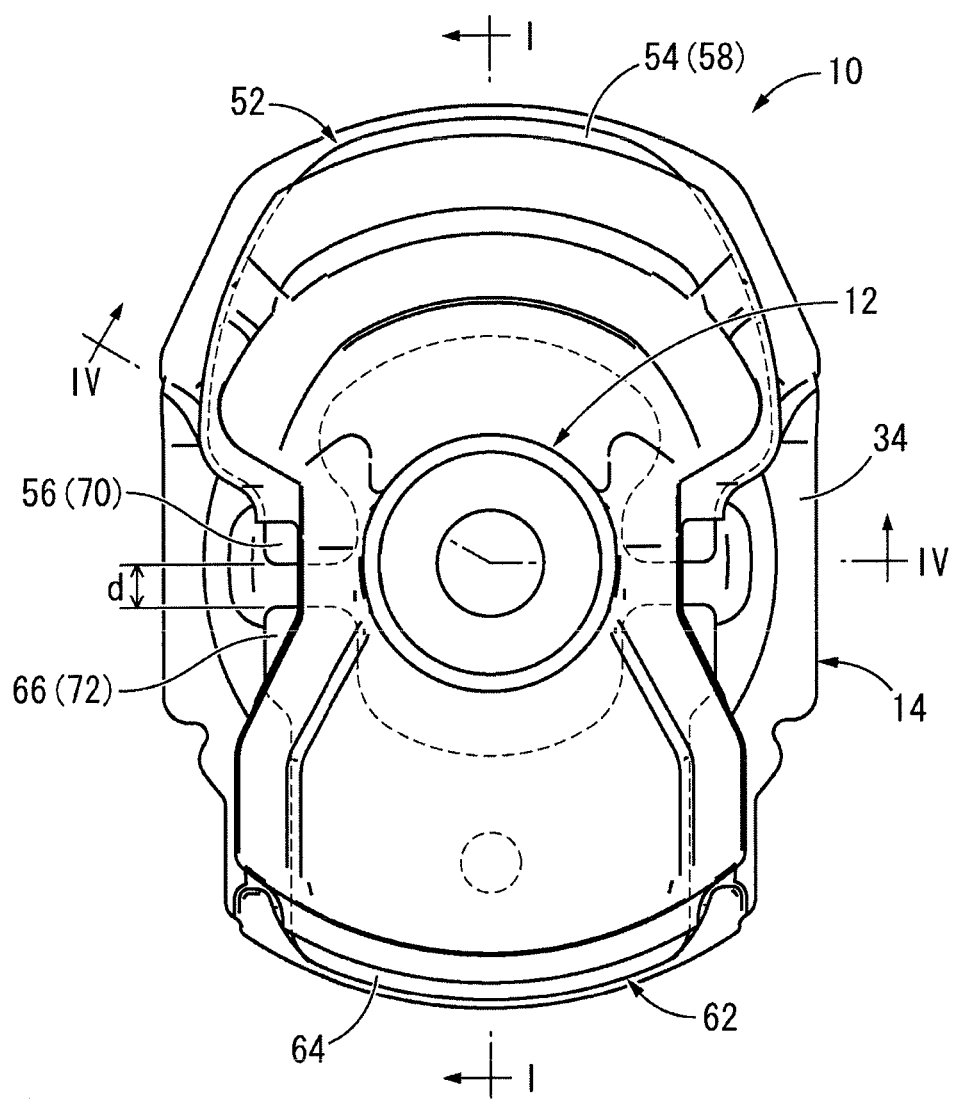
[FIG. 2] A front view of the toe correct bush illustrated in FIG. 1.

With reference to FIG. 1, the first intermediate restraining member 52 is disposed between the opposing surfaces of the inner inclined portion 24 and the outer inclined portion 36, is isolated from both the inner inclined portion 24 and the outer inclined portion 36, and is elastically supported by the compression rubber 48. The second intermediate restraining member 62 is disposed between the opposing surfaces of the inner flange 28 and the outer flange 40, is isolated from both the inner flange 28 and the outer flange 40, and is elastically supported by the connecting rubber 50. Thus, as shown in FIG. 2, the first intermediate restraining member 52 and the second intermediate restraining member 62 are disposed opposite to each other with the inner shaft member 12 therebetween in the vertical direction. The first and second feet 56 and 66 project inward in the opposing direction to the first and second intermediate restraining members 52 and 62. As shown in FIG. 2, the first feet 56 of the first intermediate restraining member 52 and the second feet 66 of the second intermediate restraining member 62 are disposed with a predetermined distance d therebetween in the direction orthogonal to the shaft. Thus, the first intermediate restraining member 52 and the second intermediate restraining member 62 are disposed in isolation from each other.

Figure 13:
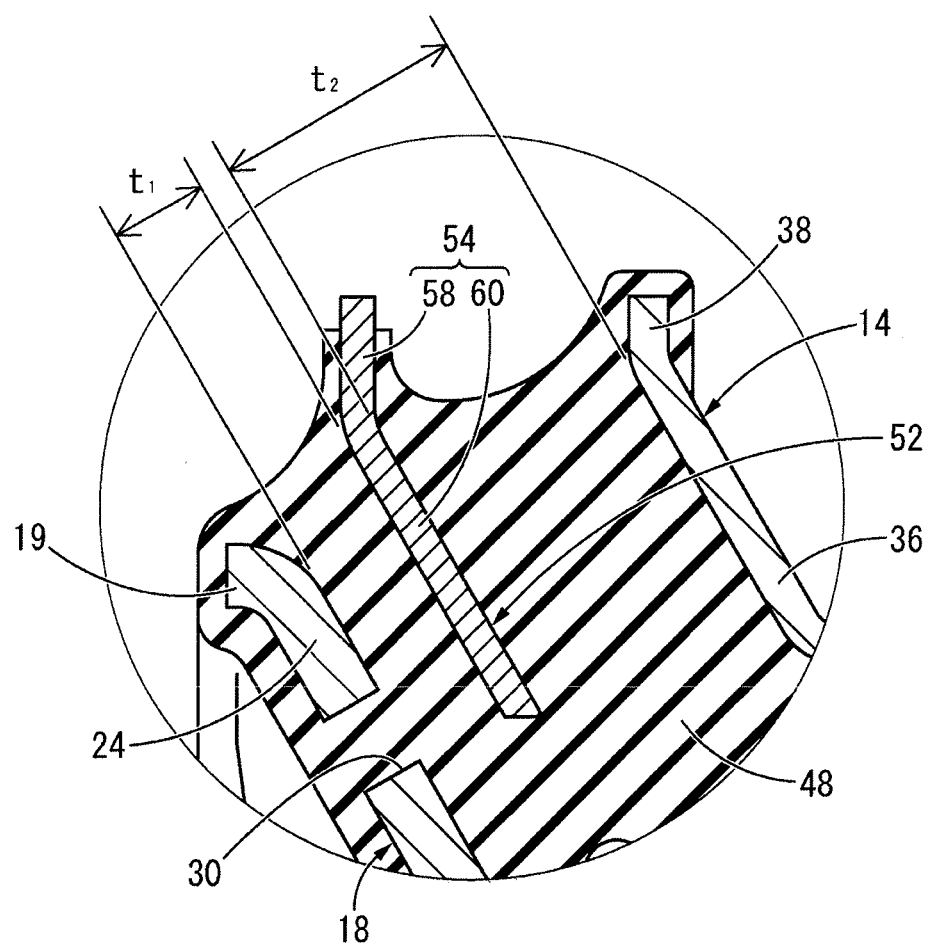
[FIG. 13] A vertical cross-sectional view illustrating an enlarged main portion of the toe correct bush illustrated in FIG. 1.
Figure 14:
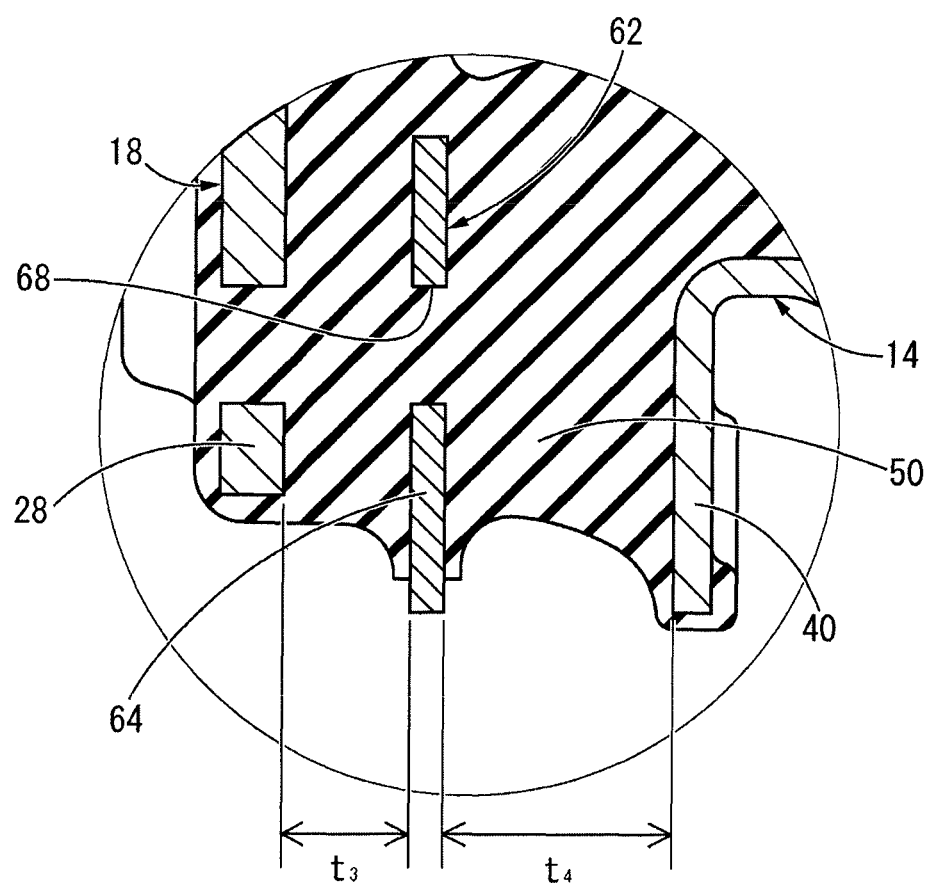
[FIG. 14] A vertical cross-sectional view illustrating another enlarged main portion of the toe correct bush illustrated in FIG. 1.

With reference to FIG. 13, the first intermediate restraining member 52 is biased toward the inner inclined portion 24 with a distance $t_1$ from the inner inclined portion 24 shorter than a distance $t_2$ from the outer inclined portion 36. With reference to FIG. 14, the second intermediate restraining member 62 is biased toward the inner flange 28 with a distance $t_3$ from the inner flange 28 shorter than a distance $t_4$ from the outer flange 40. In other words, the compression rubber 48 has a rubber thickness $t_1$ less than a rubber thickness $t_2$, the rubber thickness $t_1$ being between the first intermediate restraining member 52 and the inner inclined portion 24, the rubber thickness $t_2$ being between the first intermediate restraining member 52 and the outer inclined portion 36; and the connecting rubber 50 has a rubber thickness $t_3$ less than a rubber thickness $t_4$, the rubber thickness $t_3$ being between the second intermediate restraining member 62 and the inner flange 28, the rubber thickness $t_4$ being between the second intermediate restraining member 62 and the outer flange 40.

Figure 15:
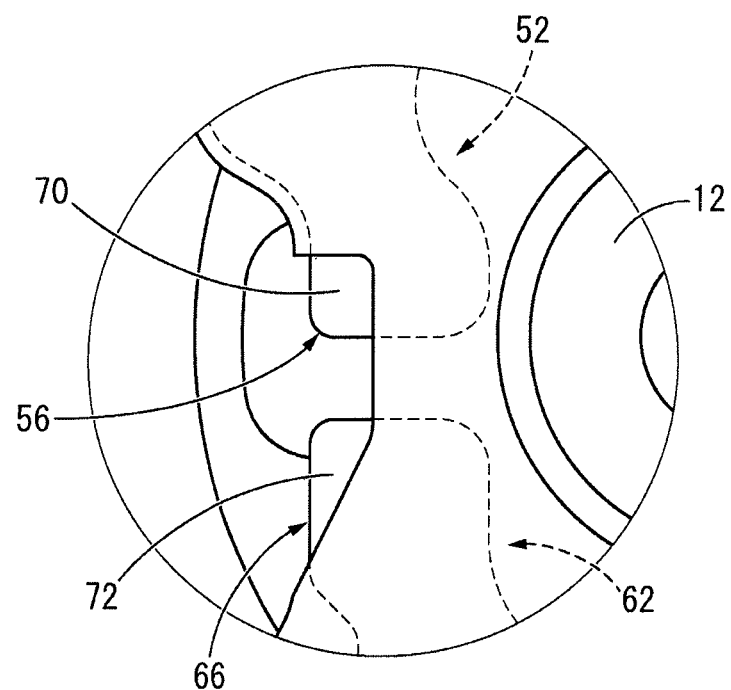
[FIG. 15] A front view illustrating yet another enlarged main portion of the toe correct bush illustrated in FIG. 1.

With reference to FIG. 15, first mold holders 70 are provided to outer peripheral portions of projecting end portions of the first feet 56 of the first intermediate restraining member 52, the first mold holders 70 being exposed to the exterior from the compression rubber 48 on the left and right sides of the inner shaft member 12. Second mold holders 72 are provided to outer peripheral portions of projecting end portions of the second feet 66 of the second intermediate restraining member 62, the second mold holders 72 being exposed to the exterior from the connecting rubber 50 on the left and right sides of the inner shaft member 12. The upper end portion of the first main body 54 (support end portion 58) of the first intermediate restraining member 52 is exposed to the exterior from the compression rubber 48, and the lower end portion of the second main body 64 of the second intermediate restraining member 62 is exposed to the exterior from the connecting rubber 50.

The toe correct bush 10 is produced by setting in a mold for vulcanization, the inner shaft member 12, the outer tubular member 14, and the first and second intermediate restraining members 52 and 62 prepared in advance; filling a rubber material in a cavity of the mold for vulcanization; and integrally vulcanizing the main rubber elastic body 16, the compression rubber 48, and the connecting rubber 50. The mold for molding includes a front mold, a back mold, and a pair of middle molds divided into the left and right. The front mold is provided more toward the fixing plate 18 than the first and second intermediate restraining members 52 and 62. The back mold is provided around the outer tubular member 14. The middle molds are provided between the front and back molds and between the first and second intermediate restraining members 52 and 62 and the outer tubular member 14. Parting lines between the front mold, the middle molds, and the back mold are indicated with dashed-two dotted lines in FIG. 1.

In vulcanization of the rubber elastic bodies 16, 48, and 50, the upper end portion of the first main body 54 and the first mold holders 70 exposed from the compression rubber 48 are aligned to the middle molds and held between the middle molds and the front mold, and thus the first intermediate restraining member 52 is positioned to the mold for molding, while the lower end portion of the second main body 64 and the second mold holders 72 exposed from the connecting rubber 50 are aligned to the middle molds and held between the middle molds and the front mold, and thus the second intermediate restraining member 62 is positioned to the mold for molding. Accordingly, the first and second intermediate restraining members 52 and 62 are stably positioned to the mold for molding, and are vulcanized to predetermined positions of the rubber elastic bodies 48 and 50.

In the present embodiment, the tubular portion 32 of the outer tubular member 14 undergoes diameter reduction, such as multi-directional drawing, after vulcanization of the rubber elastic bodies 16, 48, and 50, so as to pre-compress the main rubber elastic body 16 and the compression rubber 48. This improves durability of the rubber elastic bodies 16 and 48 against tensile stress.

The inner shaft member 12 of the toe correct bush 10 having the structure above is mounted to a vehicle body (not shown in the drawing), while the outer tubular member 14 thereof is mounted to a trailing arm of a rear wheel suspension mechanism (not shown in the drawing). Thus, the trailing arm is connected to the vehicle body with vibration dampened. The toe correct bush 10 is disposed such that the shaft direction coincides with the left-right direction of the vehicle in a front portion of the vehicle in a state of being mounted in the vehicle. The end portion having the inclined portions 24 and 36 and the flanges 28 and 40 is positioned inside in the left-right direction of the vehicle. During cornering at high speed, for example, a force input to rear wheels from a road surface is exerted on the toe correct bush 10 as a force in a tilt direction. Then, the direction of the rear wheels is changed in the same phase as a steering direction of front wheels, and a change amount of the direction of the rear wheels is prevented from being larger than necessary by compressed spring components of the compression rubber 48 and the connecting rubber 50. Accordingly, the toe correct bush 10 can enhance running stability during cornering with the toe correction function as above.

In the toe correct bush 10, the first and second intermediate restraining members 52 and 62 are vulcanized to the compression rubber 48 and the connecting rubber 50. Accordingly, the spring constant in the compression direction of the compression rubber 48 and the connecting rubber 50 is increased, thus enhancing running stability during corning and straight line performance.

In the toe correct bush 10, the first intermediate restraining member 52 fixed to the compression rubber 48 and the second intermediate restraining member 62 fixed to the connecting rubber 50 are mutually independent members. Thus, the spring property required for the compression rubber 48 and that for the connecting rubber 50 can be easily achieved by differentiating the shape or thickness of the first and second intermediate restraining members 52 and 62 and their placement positions and placement angles. This allows sophisticated control over the size of a steering amount (turning angle) with the toe correction function.

In addition, the first intermediate restraining member 52 and the second intermediate restraining member 62, which are isolated and independent from each other, are independently displaceable when the compression rubber 48 and the connecting rubber 50 deform in forms different from each other. Accordingly, an excessive stress can be prevented from being exerted on the first and second intermediate restraining members 52 and 62, and thus durability is improved.

The first intermediate restraining member 52 is biased toward the inner inclined portion 24 between the opposing surfaces of the inner inclined portion 24 and the outer inclined portion 36. Accordingly, the thickness of a portion relatively susceptible to damage (portion between the first intermediate restraining member 52 and the outer inclined portion 36) of the compression rubber 48 is large and the free length of the surface of the portion is ensured to be large, thus improving durability. In addition, the reinforcement rib 19 is provided to the projecting end of the inner inclined portion 24, and the end projection 38 is provided to the projecting end of the outer inclined portion 36. Thus, the free length of the outer end surface of the compression rubber 48 is ensured to be large. Accordingly, the durability of the compression rubber 48 is further improved, preventing occurrence of cracks.

The second intermediate restraining member 62 is biased toward the inner flange 28 between the opposing surfaces of the inner flange 28 and the outer flange 40. Accordingly, the thickness of a portion relatively susceptible to damage (portion between the second intermediate restraining member 62 and the outer flange 40) of the connecting rubber 50 is large and the free length of the surface of the portion is ensured to be large, thus improving durability.

The embodiment of the present invention is described above. The present invention, however, is not limited to the particulars thereof. For example, the shape of the first and second intermediate restraining members is not limited in particular. Specifically, the first feet 56 of the first intermediate restraining member 52 or the second feet 66 of the second intermediate restraining member 62 are not required, and the intermediate restraining members may be composed of the main bodies 54 and 64 alone. Furthermore, the main body does not necessarily have a curved shape extending in the circumferential direction, but may extend linearly in the left-right direction.

In the embodiment above, the main rubber elastic body 16, the compression rubber 48, and the connecting rubber 50 are integrally provided. Alternatively, for instance, the rubber elastic bodies 16, 48, and 50 may be provided independent from one another as separate bodies.

In addition, the inner shaft member 12 and the outer tubular member 14 may be biased in the direction orthogonal to the shaft in a standalone state before being mounted in view of static loading exerted when being mounted in a vehicle.

REFERENCE SIGNS LIST

10: Toe correct bush; 12: Inner shaft member; 14: Outer tubular member; 16: Main rubber elastic body; 24: Inner inclined portion; 28: Inner flange; 36: Outer inclined portion; 40: Outer flange; 48: Compression rubber; 50: Connecting rubber; 52: First intermediate restraining member; 56: First foot; 62: Second intermediate restraining member; 66: Second foot; 70: First mold holder; 72: Second mold holder

What is claimed is:

1. A toe correct bush in which an inner shaft member and an outer tubular member inserted around the external of the inner shaft member are connected by a main rubber elastic body; an inner inclined portion is provided in an end portion in a shaft direction of the inner shaft member, the inner inclined portion being inclined outward in the shaft direction and projecting obliquely outward in one radial direction; an outer inclined portion is provided in an end portion in a shaft direction of the outer tubular member, the outer inclined portion being inclined outward in the shaft direction, projecting obliquely outward in one radial direction, and being provided opposite to the inner inclined portion; a compression rubber is provided between opposing surfaces of the inner inclined portion and the outer inclined portion; an inner flange is provided in the end portion in the shaft direction of the inner shaft member, the inner flange projecting outward in the radial direction opposite to the inner inclined portion; an outer flange is provided in the end portion in the shaft direction of the outer tubular member, the outer flange projecting outward in the radial direction opposite to the outer inclined portion, and being provided opposite to the inner flange; and a connecting rubber is provided between opposing surfaces of the inner flange and the outer flange, the toe correct bush comprising:

a first intermediate restraining member provided between the opposing surfaces of the inner inclined portion and the outer inclined portion and fixed to the compression rubber, the first intermediate restraining member spreading and being isolated from the opposing surfaces of the inner inclined portion and the outer inclined portion;

a second intermediate restraining member provided independent from the first intermediate restraining member between the opposing surfaces of the inner flange and the outer flange and fixed to the connecting rubber, the second intermediate restraining member spreading and being isolated from the opposing surfaces of the inner flange and the outer flange; and the first intermediate restraining member and the second intermediate restraining member are opposite to each other with the inner shaft member therebetween, a pair of first feet is integrally provided in the first intermediate restraining member on two sides of the inner shaft member, the first feet projecting inward in an opposing direction of the second intermediate restraining member, and a pair of second feet is integrally provided in the second intermediate restraining member on two sides of the inner shaft member, the second feet projecting inward in an opposing direction of the first intermediate restraining member.

2. The toe correct bush according to claim 1, wherein the first intermediate restraining member is isolated from both of the inner shaft member and the outer tubular member and is elastically connected through the compression rubber, and the second intermediate restraining member is isolated from both of the inner shaft member and the outer tubular member and is elastically connected through the connecting rubber.

3. The toe correct bush according to claim 1, wherein the first intermediate restraining member and the second intermediate restraining member are isolated from each other.

4. The toe correct bush according to claim 1, wherein the first feet each have a first mold holder projecting to an exterior from the main rubber elastic body, and the second feet each have a second mold holder projecting to an exterior from the main rubber elastic body.

5. The toe correct bush according to claim 1, wherein a distance between the opposing surfaces of the first intermediate restraining member and the inner inclined portion is shorter than a distance between the opposing surfaces of the first intermediate restraining member and the outer inclined portion, and a distance between the opposing surfaces of the second intermediate restraining member and the inner flange is shorter than a distance between the opposing surfaces of the second intermediate restraining member and the outer flange.

* * * * *